(No Model.)
H. A. PARR.
TOOTH SEPARATOR.
No. 350,150. Patented Oct. 5, 1886.
Fig: 1.
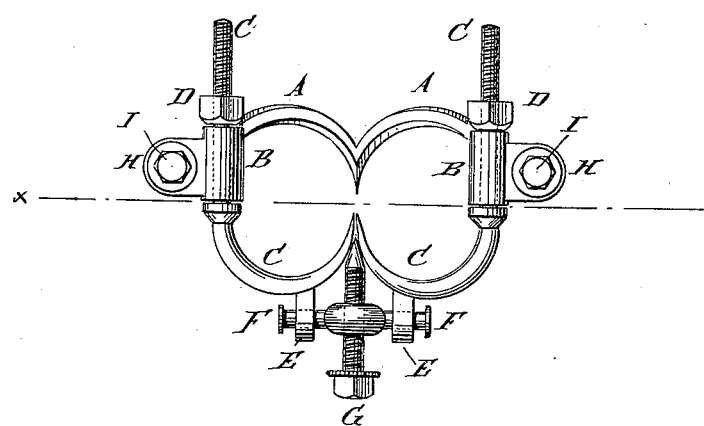
Fig: 2.
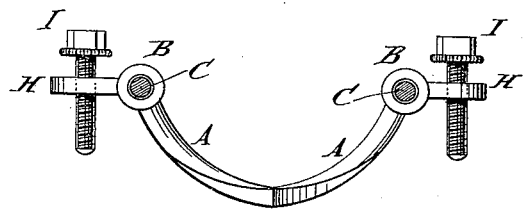
WITNESSES:
INVENTOR:
BY
ATTORNEYS.

UNITED STATES PATENT OFFICE.

HENRY A. PARR, OF NEW YORK, N. Y.

TOOTH-SEPARATOR.

SPECIFICATION forming part of Letters Patent No. 350,150, dated October 5, 1886.

Application filed February 20, 1886. Serial No. 192,656. (No model.)

*To all whom it may concern:*

Be it known that I, HENRY A. PARR, of the city, county, and State of New York, have invented a new and useful Improvement in Tooth-Separators, of which the following is a full, clear, and exact description.

Reference is to be had to the accompanying drawings, forming a part of this specification, in which similar letters of reference indicate corresponding parts in both the figures.

Figure 1 is a plan view of my improved tooth-separator. Fig. 2 is a sectional elevation of the same, taken through the line $x\ x$, Fig. 1.

The object of this invention is to provide tooth separators, by the use of which teeth can be readily separated or spread apart to any desired extent, and which shall be simple in construction and convenient in use.

The invention consists in the construction and combination of the various parts of the tooth-separator, as will be hereinafter fully described.

A represents an angular bar, the end of which is tapered to a point, and its arms are curved into semicircular form and have parallel sockets B formed upon or rigidly secured to their ends.

C are two semicircular bars, the inner ends of which are tapered to a point and meet at an acute angle directly opposite the angle of the bar A. The outer arms of the bars C are made long, pass through the sockets B, and have screw-threads upon their ends, upon which are screwed nuts D.

Upon the outer or convex sides of the bars C, at a little distance from their inner or pointed ends, are formed lugs E, the outer ends of which are perforated transversely to receive the ends of the short cross-bar F. The middle part of the cross-bar F is enlarged, and has a screw-hole formed through it to receive the screw G, the forward end of which is made pointed or conical and rests in the angular space between the pointed inner ends of the bars C. Upon the outer sides of the sockets B are formed wings or lugs H, which have screw-holes formed through them to receive the screws I. The screws I have their forward ends rounded. The screws G I are made with polygonal heads and have milled flanges formed upon them at the bases of their heads, so that they can be turned with a wrench, or with a thumb and finger, as may be desired or convenient.

In using the implement the nuts D are turned back and the arms of the curved bars C are drawn outward until the angle of the bar A can be entered between the teeth to be separated upon one side of the row of teeth, and the points of the bars C can be inserted between said teeth upon the other side of the said row of teeth. The nuts D are then screwed up until the said angle and points have been drawn firmly into place. The screws I are then turned forward until their forward ends rest upon the faces of the adjacent teeth to hold the implement horizontal, prevent it from rocking, and adjust the implement to the length of the teeth. The screw G is then turned forward, forcing its conical forward end between the points of the bars C, and forcing the said points apart until the teeth have been sufficiently separated.

The implement can be allowed to remain upon the teeth for a greater or less time, as may be desired, and can then be detached by loosening the nuts D, and turning back the screw G.

Having thus fully described my invention, I claim as new and desire to secure by Letters Patent—

1. In a tooth separator, the combination, with the angular bar A, having sharp angle and curved arms and provided with sockets B upon its ends, of the curved bars C, having tapered inner ends and long outer arms having screw-threads upon their ends, and provided with perforated lugs E upon the inner parts of their convex sides, and cross-bar F, inserted in the said lugs and provided with a central screw-hole, the screw G, having conical forward end, and the nuts D, screwed upon the ends of the bars C, substantially as herein shown and described, whereby teeth can be readily separated, as set forth.

2. In a tooth-separator, the combination, with the sockets B, formed upon the angular bar A and receiving the outer arms of the bars C, of the lugs H, formed upon the said sockets and having screw-holes, and the screws I, screwed into the said screw-holes and having rounded forward ends, substantially as herein shown and described, whereby the implement can be readily leveled upon the teeth and adjusted to the length of the teeth, as set forth.

HENRY A. PARR.

Witnesses:
 JAMES T. GRAHAM,
 C. SEDGWICK.